May 28, 1946.　　　C. J. KUCYN　　　2,401,000
MILLING FIXTURE
Filed Sept. 14, 1943　　　2 Sheets-Sheet 1

INVENTOR.
CHESTER J. KUCYN
BY Robert C. Rasche
ATTORNEY.

May 28, 1946.    C. J. KUCYN    2,401,000
MILLING FIXTURE
Filed Sept. 14, 1943    2 Sheets-Sheet 2
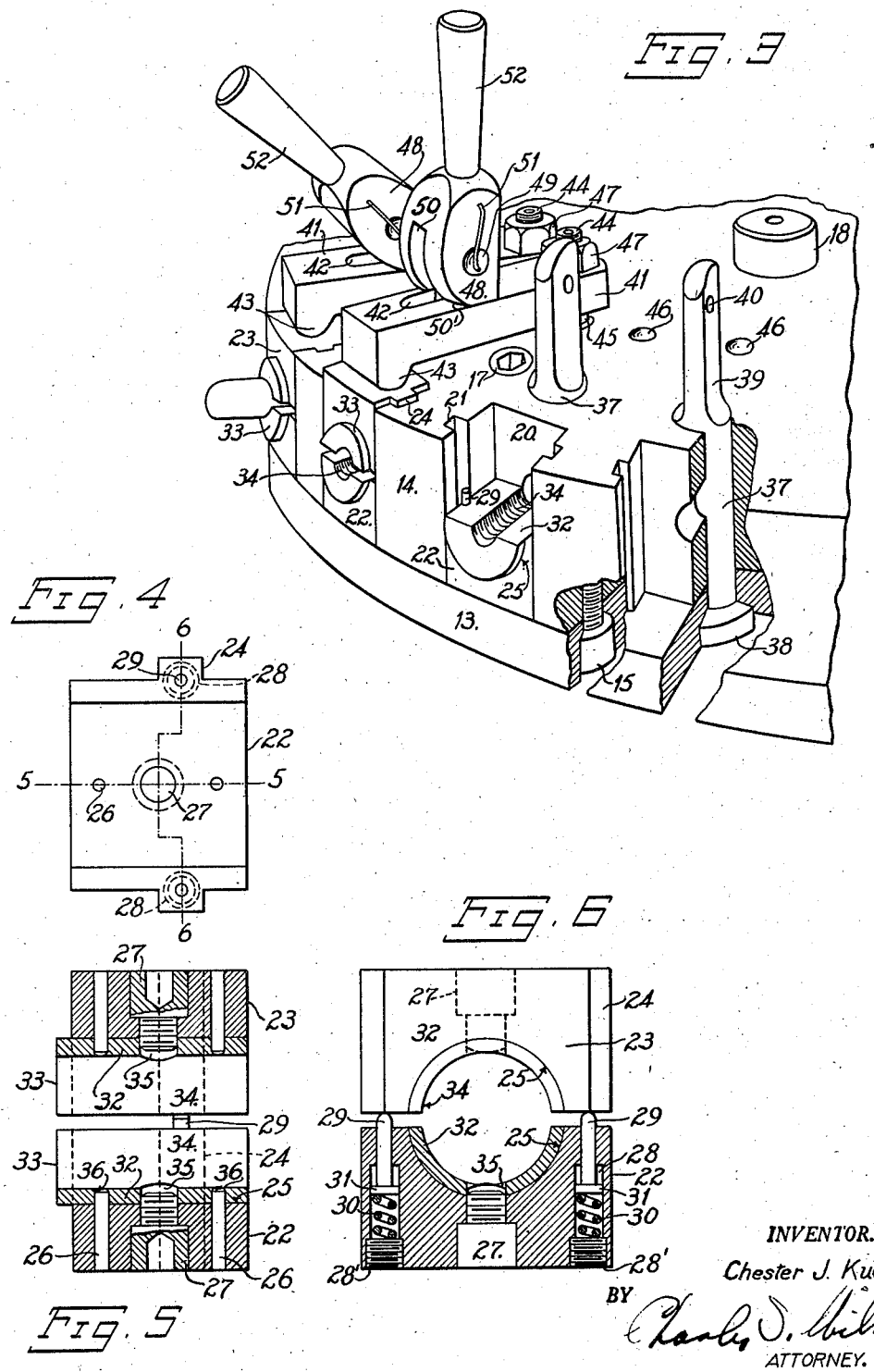
INVENTOR.
Chester J. Kucyn
BY
ATTORNEY.

Patented May 28, 1946

2,401,000

UNITED STATES PATENT OFFICE 2,401,000

MILLING FIXTURE

Chester J. Kucyn, Huntington, N. Y., assignor to Republic Aviation Corporation, a corporation of Delaware Application September 14, 1943, Serial No. 502,283

3 Claims. (Cl. 90—59)

This invention relates to milling machine fixtures or attachments and contemplates a rotary fixture operating in conjunction with a miller that will so receive and individually hold a plurality of work pieces that they will be successively and continuously presented to an appropriate cutter and may be readily removed and replaced without interrupting the continuous operation of either the miller or of the instant fixture or attachment.

Among its objects the present invention proposes means whereby the several work piece engaging and holding means can be individually adapted to receive and closely clamp pieces of various cross sectional contours and of differing overall sizes.

With the above and other objects in view, as will be apparent, the invention consists in the construction, combination and arrangement of parts, all as hereinafter more fully described, claimed and illustrated in the accompanying drawings, wherein—

Fig. 3 is a fragmentary perspective view of the rotary fixture, certain parts thereof being removed and others broken away for the purpose of clarity of illustration:

Fig. 4 is a plan view of one of the chuck blocks holding the work being operated upon:

Fig. 5 is a section along line 5—5 of Fig. 4 showing a coacting pair of chuck blocks: and Fig. 6 is also a section along line 6—6 of Fig. 4, taken at right angles to the plane of Fig. 5, the upper chuck therein being shown in elevation.

Figure 1:
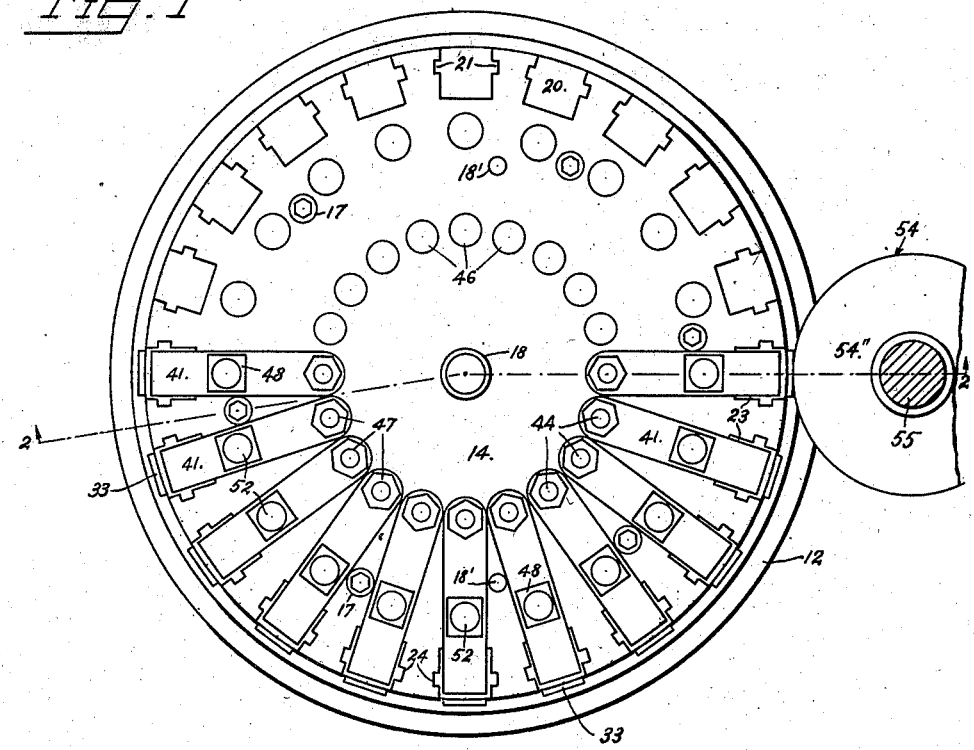
Fig. 1 is a plan view of a rotary fixture constructed in accordance with the present invention.

Heretofore the milling of standard parts, especially rod ends and the like, has been done on horizontal milling machines using gang cutters. This procedure and the equipment employed in carrying it out usually operated upon two or three rods or work pieces at one time and involved the stopping of operation to load or unload the fixture. This involved not only skill on the part of the operators but also required that the fixture and milling machine be operated slowly in order to acquire the necessary accuracy.

The present fixture is mounted for rotation with a power driven rotary table and comprises a chuck holder carrying a series of work clamps or pairs of chuck blocks which may be readily and quickly opened and closed during the rotation of the table and without interrupting or reducing the rate of its rotation. This table and chuck holder by its rotation successively brings the rod ends or other work pieces being operated upon to the milling tool or cutter which can consist of a plurality of cutters each designed to make an individual cut upon the work presented to it. The operator inserts the rod ends or work pieces into the clamps or chucks carried by the chuck hold and removes the work pieces which have been operated on by the cutter.

Reference being had more particularly to the drawings 10 designates the standard base of the tool which base is mounted on the bed of a standard milling machine and suitably connected through a shaft and gearing (not shown) to the drive shaft or other source of power of the milling machine. The milling machine, which forms no part of the invention, is not shown. This base 10 carries a rotary table 12 and the fixture forming the subject matter of the present invention is fixed to the table 12 for rotation therewith.

The present fixture comprises a bed plate 13 upon which is fixed the face plate 14 by means of the screws or bolts 15 piercing the bed plate 13 and the face plate 14. These bolts 15 pierce these two plates at appropriate points and have threaded engagement with at least one of said plates. The plates 12 and 13 in combination constitute a chuck holder and in order to provide the proper width or depth for the chuck holder the face plate 14 on its inner side is spaced from the bed plate 13 by integral relatively wide flange 16 formed at and adjacent to its periphery and the boss 16' adjacent to and concentric with the center of the face plate. The flange 16 and the boss 16' are of the same depth and therefore position the bed plate 13 and the face plate 14 in spaced parallel relation with a substantial body of metal interposed between the periphery of the face plate and that of the bed plate wherein the individual work chucks are mounted as will be hereinafter more fully described. In order to secure the entire chuck holder to the rotary table 13 a series of bolts 17 pass through the face plate at relatively close intervals adjacent to the periphery thereof and through the bed plate 13 to be threaded into the rotary table 12. Thus, when the fixture is mounted on the rotary table 12, the table 12, bed plate 13 and face plate 14 become a complete unit and rotate in unison about the axis of the table 12.

In order to properly position the chuck holder consisting of the bed plate 13 and the face plate 14 secured together by the bolts 15 upon the table 12 with the aperture through which the bolts 17 operate in proper alignment, the concentric stub shaft or pin 18 is positioned through the boss 16' and the plates 13 and 14 to be seated in a socket 19 of the table 12. A pair of dowel pins 18' are fixed to the table 12 on opposite sides of the shaft or pin 18. The chuck holder 13—14 is provided with passages which correspond in their positions to the shaft or pin 18 and the dowel pins 18' and into which these elements project. Thus the chuck holder 13—14 is centered on the rotary table 12 with the passages therein for the bolts 17 registered with the interiorly threaded corresponding bolt holes in the table 12 and the bolts 17 may be inserted in these registered openings and passages and threaded home in the bolt holes in the table 12 thereby removably but rigidly and fixedly securing the chuck holder 13—14 to the table 12 for rotation therewith.

Around the periphery of the chuck holder and formed in the flange 16, which is deep and heavy for that purpose, are a series of pockets 20. These pockets are substantially vertical and are open at their outer sides, extending vertically through the face plate 14 to terminate at their bottoms at the adjacent face of the bed plate 13. Upon each side of each pocket is a vertical keyway 21, the keyways upon the opposed sides of each pocket being aligned transversely of the pocket.

A pair of chuck blocks 22 and 23 are mounted in each pocket 20 and each is provided with a projecting key 24 on each side thereof which is slidably received in the keyways 21 of the coacting pocket.

The lower chuck block 22 is provided with an approximately coextensive depression 25 in its upper face the surface of which is semi-cylindrical, though it may be of any other shape such for instance as a series of flat surfaces angularly disposed one to the other. However, the semi-cylindrical form shown is preferable. At the bottom and in longitudinal alignment of the center of the depression 25 is a pair of dowel pins 26 and between these dowel pins is a screw 27 threaded through the block 22 and adjustable from the bottom face of the block. The purpose and utility of these pins 26 and screw 27 will be hereinafter more fully described.

Adjacent each key 24 and located partly in the key, the lower chuck block 22 has a passage 28 in which a pin 29 is mounted to be normally projected at its outer end above the upper surface of the block at the sides of the depression and the key 24 by the action of a compression spring 30 housed within the said passage. This spring 30 bears against the head 31 on the inner end of the pin 29 at one of its ends and at its other end against an adjusting screw 28' operating through the bottom of the block 22, the head of said screw being at all times either flush with or counter-sunk in the bottom face of said block 22. Thus each lower chuck block has a pair of pins 29 for the purpose of contacting the substantially abutting portions of the upper complemental chuck block 23 to move the latter in a direction away from the lower block 22 when it is free to so move.

The upper chuck block 23 is a substantial duplicate of the lower chuck block 22, in that it is provided with a centering screw 27 and the aligning dowel pins 26. It is not, however, provided with any retractable spring operated projecting pins 29 as in the lower block 22. It also has keys 24 on its sides which seat and slide in the keyways 21 of the pocket 20 in direct alignment with the key 24 of the lower chuck block 22. When the upper block 23 is inverted and positioned in the pocket 20 above the lower chuck block 22, the depressions 25 of both blocks complement one another to create a complete geometric figure in cross section. In short, the depressions 25 of the two blocks 22 and 23 in combination create, in the form shown, a passage between the blocks circular in cross section though manifestly this passage could as readily be rectangular, hexagonal, octagonal or any other desired shape in cross section.

Between each pair of chuck blocks 22 and 23 is positioned an adapter which is designed to engage a work piece and to conform the shape and size of the complemental depressions 25 of the chuck blocks to the shape and size of the work piece. In that form of the present invention which is illustrated, the adapter comprises a pair of adapter halves 32 each consisting of a plate shaped exteriorly to conform to the shape of the depression 25 in the chuck block 22 or 23 with which it is to cooperate. Here it is shown as semi-cylindrical or curved, but it may be of any exterior shape which corresponds exactly to the shape and size of the cooperating depression 25. At its outer end this adapter half is provided with an outstanding portion which when the adapter half is situated in its coactive chuck block extends beyond the outer face of the block. The inner face of the adapter half 32 is provided with a longitudinal depression 34 shaped and formed to correspond to the shape, form and size of one-half of the work piece to be received therein, and in some instances, where a threaded work piece is being operated upon, this depression 34 may be provided with half threads (as shown in Fig. 3) to engage the already threaded shank of the work piece which is received therein. The outer surface of each adapter half 32 is provided centrally of its length with a screw hole 35 and upon each side thereof are the holes 36. When the adapter half 32 is seated in the depression 25 of either the upper chuck block 23 or the lower chuck block 22, the dowel pins 26 are received in the holes 36 and the end of the screw 27 engages in the screw hole 35 in the adapter half. The adapter half 32 is centered and removably secured in the depression 25 by the engagement of the screw 27 of the chuck block in the threaded screwhole 35 of the adapter half. The coaction between the dowel pins 26 and the holes 36 longitudinally aligns the adapter half 32 in the depression.

The adapter halves 32, one carried by the lower block 22 and the other by the upper block 23, combine to create a passage in which the work piece is received and held. This passage, by changing the shape of the groove 34 in each adapter half may be of any shape or contour even if the outer face of the adapter half and its coacting depression 25 are semi-cylindrical. Thus an adapter made up of two adapter halves 32, which is cylindrical exteriorly, may have a faced passage therebetween consisting of the two complemental grooves 34 in the adapter halves 32.

If the upper chuck block 23 is free to move relative to the face plate 14, the pins 29 abutting and operating against each side of the block 23 and carried by the lower block 22, force the upper block upwardly in the keyways 21 in a direction away from the lower block 22 until the movement thereof is arrested. Thus the chuck blocks 22—23 and their companion adapter halves 32 separate automatically to release any work piece engaged therebetween and to receive new work piece to be operated upon.

For the control and regulation of the upper chuck block 23 for the purpose of releasing a completed work piece and the insertion of a new work piece, the face plate 14 adjacent its periphery and near the inner face of the pocket 20, is provided with a spindle 37 which is fixedly secured to the chuck holder by passing through the bed plate 13, the face plate 14 and the flange 16 therebetween. The lower end of this spindle is provided with a head 38 seated flush in a cavity in the under face of the bed plate 13, and at its other end it projects some distance above the outer or upper face of the face plate. The upper end of the spindle is flattened to create two opposed surfaces 39 and is pierced by an aperture 40. An elongated clamp bar 41, provided with a slot 42, is seated on or adjacent the outer face of the face plate 14 by the reception of the projecting portion 39 of the spindle in the slot 42 of the clamp bar. One end of the bar 41 extends over the upper chuck block 23 and is there provided with a toe 43 projecting from the inner face of the outer terminal thereof for engagement against the outer face of the upper chuck block 23. The inner end of this clamp bar 41 is provided with a bolt 44 threaded therethrough having a spherical inner end 45 which operates loosely in a conical depression 46 formed in the outer surface of the face plate 14. The outer extremity of this bolt is engaged by a lock nut 47 which retains the bolt 44 in its adjusted position with respect to the clamping bar 41. The play or movement of the clamping bar 41 may be accurately adjusted by threading the bolt 44 through the bar thereby regulating the degree of projection of the bolt below the lower surface of the clamp bar.

A cam 48 is pivoted to the outer extremity 39 of the spindle 37 by a pin 49 passing through the spaced sides 50 of the cam, said extremity 39 operating in the space between the sides 50 of the cam. The pin 49 passes loosely through the sides 50 of the cam surfaces 50' which contact the outer face of the clamp bar 41, and the aperture 40 of the spindle 39, a yoke spring 51 being swingably mounted in the body of the cam so that its extremities engage over and in the cupped extremities of the pin 49 thereby retaining the pin in its place and the cam pivotally mounted at the outer extremity of the spindle 39. A handle 52 is provided on the cam 48 for the swinging thereof about the pin 49.

Figure 2:
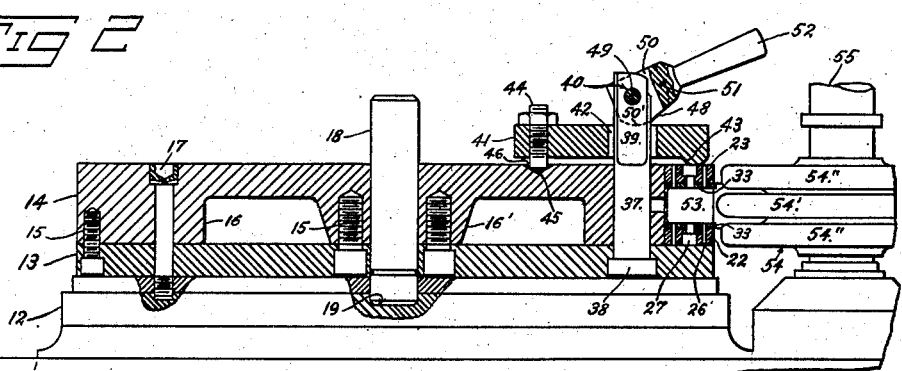
Fig. 2 is a transverse section taken along the line 2—2 thereof.

As the handle 52 is moved outwardly towards the periphery of the face plate 14, the cam surfaces of the sides 50 operate against the outer face of the clamp bar 41 upon each side of the slot 42 and forces it toward the outer surface of the face plate 14. This movement causes the upper chuck block 23 to move downwardly in the pocket 20 until the adapter half 32 therein contacts or approximately contacts the adapter half 32 in the lower block 22. Any work positioned in the depressions 34 of the adapter halves is thereby firmly but releaseably clamped between the adapter halves and their coacting chuck blocks with the portion thereof to be operated upon projecting therefrom as illustrated in Fig. 2. When the lever 52 is moved in a reverse direction, the pressure on the outer end of the upper chuck block 23 is relieved and the springs 30 in the complemental lower chuck block 22 automatically force the pins 29 upwardly thereby causing them to lift the upper chuck block 23 upwardly in the pocket and by this separation of the blocks 22—23 and the adapter halves 32 carried thereby permits the removal of any engaged work piece and the replacement thereof.

Thus an operator can quickly remove a work piece designated generally as 53 in Fig. 2 and at almost the same time insert a new work piece to be operated upon.

During the operation the table 12 and the chuck holder consisting of the bed plate 13 and face plate 14, rotate continuously but an operator standing at a point generally opposed to the tool or even adjacent to the side of the tool from which the finished work departs, may successively operate each cam handle 52 to instantly remove the completed work and insert new work.

The bolts 44 not only provide for an adjustment of the position of the toes 43 of the clamp bars 41, but also by their regulation adjust and control the clamping action of the cam surfaces.

Positioned adjacent the periphery of the chuck holder 13—14 and in substantially the plane of the passage in the adapter is a cutting tool 54 operated by a shaft 55 normal to the plane of the chuck holder. The shaft 55 is connected in any suitable manner to the head of the milling machine with which the fixture cooperates and is rotated thereby. This tool 54 may change to conform with the character of the work to be done and in the present instance constitutes a triple cutter. The center cutter 54' cuts a slot in the projecting end of the work piece 53 while the side cutters 54'' operate to form flats upon the opposed faces of the projecting portion of the work piece.

In short, the present invention provides a rotary chuck holder having a plurality of chuck blocks adaptable to the reception and holding of work pieces of almost any shape and size in such position that the portions thereof to be operated upon project radially from the periphery of the chuck holder. The rotation of the chuck holder successively presents these projecting portions of the work pieces to the cutter 54 whereby it may operate upon them. Without stopping the rotation of the fixture or the operation of the tool, the finished work pieces may be removed and new work pieces inserted rapidly and accurately and without adjustment of any kind beyond the mere clamping action of the cams 48.

When it is desired to change the chuck blocks or to remove the adapters therefrom to place new adapters therein, the yoke spring 51 may be swung relative to the cam which permits the removal of the pin 49 and the subsequent removal of the cam and clamp bar 41 from engagement and cooperation with the projecting end of the spindle 37 whereupon the chuck blocks 22—23 may be removed from the pocket and the adapter halves 32 removed therefrom. New chuck blocks may be inserted if desired, and even if new chuck blocks are not required new adapter halves may be substituted for those already in the depressions 25 of the chuck blocks, thereby adapting the entire chuck to a new shape and size of work piece.

As an index for the depth to which the work piece 53 is inserted between the adapter halves 32 the projecting portions 33 of the cutter contact the work piece to limit its movement inwardly of the chuck. Where the recesses of adapter halves are other than semi-cylindrical, such, for instance, as rectangular, octagonal, etc., for cooperation with similarly formed work pieces the forms of the recesses and of the work piece cooperate to properly position angularly the latter.

The inventive concepts and several illustrative embodiments thereof having been thus disclosed in the manner required by the statutes, what is claimed as new is:

1. The combination with a rotary chuck holder having a series of open pockets in its periphery, each pocket having keyways in the side walls thereof normal to the top surface of the holder and the holder being provided with a depression in its top surface between the center of the holder and each pocket, of a spindle projecting upwardly from the holder adjacent each pocket between the pocket and the aligned depression, a pair of chuck blocks mounted in each pocket having opposed keys projecting therefrom for reception and operation in the opposed keyways aforesaid, and means mounted on the spindle for determining the relative positions of said chuck blocks, having an adjustment coacting with the depression aforesaid.

2. The combination with a rotary chuck holder having a series of open pockets in its periphery, each pocket having key-ways in the side walls thereof normal to the top surface of the holder and the holder being provided with a depression in its top surface between its center and each pocket, of a spindle projecting upwardly from the holder adjacent each pocket between the pocket and the aligned depression, a pair of chuck blocks mounted in each pocket having keys projecting therefrom for reception and operation in the opposed key-ways aforesaid, a slotted bar slidably mounted on each spindle having a toe at one end bearing against the upper of the cooperating chuck blocks, and an adjusting bolt operating through the opposed end to be seated in said depression, means carried by said spindle above said clamp bar to regulate the pressure of the toe of the clamp bar on the upper of said chuck blocks, and means for maintaining the upper of said chuck blocks in constant contact with the toe of said clamp bar.

3. The combination with a rotary chuck holder having a series of open pockets in its periphery, each pocket having key-ways in the side walls thereof normal to the top surface of the holder and the holder being provided with a depression in its top surface between its center and each pocket, of a spindle projecting upwardly from the holder and each pocket between the pocket and the aligned depression, a pair of chuck blocks mounted in each pocket having keys oppositely projecting therefrom for reception and operation in the opposed key-ways aforesaid, a slotted bar slidably mounted on each spindle having a toe at one end bearing against the upper of the cooperating chuck blocks and an adjusting bolt operating through the opposed end and seated in said depression, a cam pivoted to the end of said spindle to operate against the outer surface of said clamp bar to regulate the pressure exerted by the toe thereof on the upper of said chuck blocks, and means cooperating with said chuck blocks to maintain the upper thereof in constant contact with the toe of the clamp bar.

CHESTER J. KUCYN.